(12) United States Patent
Kwiatkowski et al.

(10) Patent No.: US 12,062,131 B2
(45) Date of Patent: Aug. 13, 2024

(54) SIX-DoF MEASUREMENT AID

(71) Applicant: LEICA GEOSYSTEMS AG, Heerbrugg (CH)

(72) Inventors: Tomasz Kwiatkowski, Moosleerau (CH); Daniel Moser, Seengen (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 307 days.

(21) Appl. No.: 17/671,441

(22) Filed: Feb. 14, 2022

(65) Prior Publication Data

US 2022/0262067 A1 Aug. 18, 2022

(30) Foreign Application Priority Data

Feb. 15, 2021 (EP) .................................... 21157230

(51) Int. Cl.
| | |
|---|---|
| *G06T 17/00* | (2006.01) |
| *G01B 11/00* | (2006.01) |
| *G01S 17/66* | (2006.01) |
| *G06T 7/73* | (2017.01) |

(52) U.S. Cl.
CPC ............ *G06T 17/00* (2013.01); *G01B 11/002* (2013.01); *G01S 17/66* (2013.01); *G06T 7/74* (2017.01); *G06T 2207/10028* (2013.01)

(58) Field of Classification Search
None
See application file for complete search history.

(56) References Cited

U.S. PATENT DOCUMENTS

| | | | | |
|---|---|---|---|---|
| 2014/0267619 | A1* | 9/2014 | Bridges | G01B 11/2513 |
| | | | | 348/46 |
| 2016/0327383 | A1* | 11/2016 | Becker | G01B 11/25 |
| 2020/0049486 | A1* | 2/2020 | Christine | G01B 5/008 |
| 2020/0363532 | A1* | 11/2020 | Mesher | G01S 7/497 |
| 2022/0331028 | A1* | 10/2022 | Sternitzke | G05D 1/0094 |
| 2023/0099779 | A1* | 3/2023 | Redgewell | G01S 17/66 |
| | | | | 356/614 |

FOREIGN PATENT DOCUMENTS

| | | |
|---|---|---|
| DE | 11 2014 001459 B4 | 10/2019 |
| DE | 10 2018 110852 A1 | 11/2019 |

OTHER PUBLICATIONS

EP Search Report and Written Opinion in Application No. 21157230.0 dated Aug. 2, 2021.

* cited by examiner

*Primary Examiner* — Talha M Nawaz
(74) *Attorney, Agent, or Firm* — Maschoff Brennan (57) ABSTRACT

The invention relates to a six-DoF measurement aid for determining 3D coordinates of a multiplicity of object points to be measured in the form of 3D points of a point cloud in cooperation with a laser tracker, having an environment sensor arrangement and a control module. The control module comprises a platform control assistance functionality, which is configured to instruct the environment sensor arrangement, during the automatically guided movement of the six-DoF measurement aid, in a first mode to generate environmental information for determining an environmental normal, and in a second mode to generate environmental information for detecting anomalies with respect to the environmental normal, and to provide the environmental information generated by the environment sensor arrangement for control assistance of the platform control.

13 Claims, 4 Drawing Sheets

SIX-DoF MEASUREMENT AID

TECHNICAL FIELD OF THE INVENTION

The invention relates to a six degrees of freedom (six-DoF) measurement aid for the automatically guided measurement of objects.

BACKGROUND

In object measurement technology, there are various known systems for determining 3D coordinates of points to be measured of an object surface. One example of such a system is a laser tracker which cooperates with a measurement aid trackable by the laser tracker. Typically, the position and orientation of the measurement aid is determined and tracked by the laser tracker in up to six degrees of freedom (six DoF), the measurement aid haptically or contactlessly measuring the points to be measured of the object surface. The measurement data generated by means of the measurement aid and the position and orientation of the measurement aid which are determined by the laser tracker then make it possible to determine 3D coordinates of points to be measured of an object surface. One example of such a measurement aid is an optical scanner. This uses optical measurement radiation in order to sample object surfaces to be measured. By means of the sampling, 3D coordinates of individual points of the object surface—so-called object points—are determined. These 3D coordinates are conventionally stored in the form of 3D points in a point cloud. The information contained in such a point cloud, for example a 3D point cloud, may for example be used in the scope of postprocessing for visualization of the measured object or else for comparison of measurement values with reference values. In the case of components produced serially and in a highly automated fashion, very precise and automated component measurement may be useful in order to make the production process more efficient and also to improve the quality of the parts produced. To this end, automatically guided measurement systems have also been used for a relatively long time and are ever-increasingly being used. For the use of such automatically guided measurement systems, it is crucial for the systems to require little maintenance and to be usable as far as possible free from interruption.

It is therefore an object of the invention to provide an improved six-DoF measurement aid which is used to ascertain 3D coordinates of object points in the form of 3D points of a point cloud. The six-DoF measurement aid may to this end be used in an automatically guided fashion, the improved six-DoF measurement aid allowing more efficient object/component measurement, which in turn contributes to increasing the efficiency of, for example, an associated component production process.

DESCRIPTION OF THE INVENTION

The invention relates to a six-DoF measurement aid for use in a system comprising a laser tracker for position and orientation determination of the six-DoF measurement aid for determining 3D coordinates of a multiplicity of object points to be measured in the form of 3D points of a point cloud, having a coupling device for coupling the six-DoF measurement aid to a platform which is automatically guided by means of a platform control, the platform being automatically guided along an at least approximately predefined path in an environment in order to carry out repeated measuring tasks, an environment sensor arrangement for generating environmental information, and a control module which is communicatively connected to the environment sensor arrangement and can be connected to the platform control, wherein the control module comprises a platform control assistance functionality, in the scope of which the control module is configured, in a state coupled to an automatically guided platform, to instruct the environment sensor arrangement, during the automatically guided movement along the predefined path, in a first mode to generate environmental information for determining an environmental normal, and in a second mode to generate environmental information for detecting anomalies with respect to the environmental normal, and to provide the environmental information generated by the environment sensor arrangement for control assistance of the platform control.

The six-DoF measurement aid may in this case, for example, be a measurement sensor construction such as an optical scanner moved in a mobile fashion, for example a laser light-based triangulation scanner or a white-light scanner. The six-DoF measurement aid may also be a measurement sensor construction such as a stereo camera-based setup, which for example makes it possible to determine 3D coordinates of object points on the basis of a photogrammetry principle. The six-DoF measurement aid may likewise be a measurement aid which comprises a measurement sensor construction, or to which a measurement sensor construction such as an optical scanner moved in a mobile fashion, for example a laser light-based triangulation scanner and/or a white-light scanner and/or a stereo camera-based setup, can be coupled. Equally, for example, haptically measuring measurement sensor constructions may also be coupled to the six-DoF measurement aid. The six-DoF measurement aid in this case makes it possible to determine its position and orientation by means of a laser tracker in up to six degrees of freedom.

The six-DoF measurement aid, for example the optical scanner moved in a mobile fashion, is typically used to measure objects/components in a predefined, object-specifically identical way. In this case, particular predefined object points of a component/object or predefined regions of the component/object, comprising a multiplicity of object points, are measured. For this purpose, the six-DoF measurement aid is coupled to a platform automatically guided by means of a platform control, and is therefore movable in an automatically guided fashion to the object points or regions to be measured. The platform in this case guides the coupled six-DoF measurement aid automatically along an at least approximately predefined path to the object points or regions to be measured. The six-DoF measurement aid moved to the determination location samples the object points to be measured, the 3D coordinates of the object points being determinable on the basis thereof, for example in cooperation with a laser tracker. The measured 3D points form a point cloud which comprises the 3D information of the measured object points.

If, according to one embodiment, the six-DoF measurement aid is an optical scanner, it comprises an optical sampling module which typically samples object points to be measured by means of distance measurement radiation at a particular angle. One common distance measurement principle is, for example, the principle of triangulation. On the basis of the distance and direction to an object point which have been ascertained in this way, and the position and orientation of the optical scanner which have been determined, the 3D coordinates of a sampled object point may be determined in cooperation with a laser tracker.

The coupling device of the six-DoF measurement aid may be designed alternatively both to couple a handle, which can be held in the hand by a user and makes the six-DoF measurement aid manually movable, to the six-DoF measurement aid, and to couple the six-DoF measurement aid to a platform automatically guided by means of a platform control. In the coupled state, the six-DoF measurement aid is connected in a fixed pose to the handle or the platform. The fixed-pose connection may for example be provided by means of corresponding form-fit elements, corresponding friction-fit elements or a combination thereof—respectively on the coupling device and the handle or the platform. The platform is automatically guided by the platform control along an at least approximately defined path in an environment for the purpose of carrying out repeated measuring tasks/object measurement tasks/component measurement tasks. The platform may to this end, for example, be fitted on a robot arm. The at least approximately predefined path is in this case established in such a way that the platform is brought to the object points or regions to be measured in such a way that they can be measured by means of the six-DoF measurement aid.

An improvement of the efficiency in the object-specifically identical measurement of objects or components is then achieved according to the invention in that the automatically guided movement of the six-DoF measurement aid to the object points or regions to be measured can be automatically controlled continuously in the course of the movement on the basis of environmental information generated by an environment sensor arrangement of the six-DoF measurement aid.

The environment sensor arrangement is designed to generate environmental information for characterizing the environment in which the six-DoF measurement aid is moving. The environment sensor arrangement may to this end comprise a multiplicity of sensor elements and also a multiplicity of different sensor elements, or sensor element types. In this case, the type of environmental information which is generated is determined by the respective sensor element. For example, the environment sensor arrangement may comprise contactlessly measuring proximity sensors which generate an approach of an object, in the environment in which the six-DoF measurement aid is moving, closer to the six-DoF measurement aid than a particular threshold value as environmental information. The environment sensor arrangement may also comprise contact sensors which generate mechanical contact of an object/obstacle with the six-DoF measurement aid as environmental information. For example, the environment sensor arrangement may also comprise contactlessly measuring distance sensors which generate distance information items relating to distances of the six-DoF measurement aid to surfaces in the environment in which the optical scanner is moving as environmental information. The environment sensor arrangement may also comprise one or more camera sensors which generate image data relating to the environment in which the six-DoF measurement aid is moving as environmental information. The environment sensor arrangement may likewise comprise acceleration sensors which generate acceleration information relating to the movement of the six-DoF measurement aid in the environment as environmental information. The environment sensor arrangement may also comprise temperature sensors which generate temperature information relating to the environmental temperature as environmental information.

Communicatively connected to the environment sensor arrangement is a control module of the six-DoF measurement aid, which is also communicatively connectable to the platform control. That is to say, the control module is communicatively connected to the sensor elements of the environment sensor arrangement, and is communicatively connectable to the platform control, in which case instructions/data/signals may be transmitted via the communicative connection.

The movement, automatically guided by means of the platform control, of the six-DoF measurement aid along an at least approximately predefined path can be controlled continuously in the course of the automatic guiding in that, according to the invention, the control module comprises a platform control assistance functionality. If the six-DoF measurement aid is coupled to the automatically guided platform, then the control module is configured in the scope of the platform control assistance functionality to instruct the environment sensor arrangement to generate environmental information in a first and a second mode, during the automatically guided movement of the six-DoF measurement aid along the at least approximately predefined path. In this case, the control module instructs the environment sensor arrangement in the first mode to generate environmental information which characterizes the environment in which the six-DoF measurement aid is moving in such a way that this environmental information can be used to determine a reference environment, i.e. an environmental normal. This first mode is advantageously used when the automatic guiding of the platform takes place in the scope of a "teaching" process. Such a "teaching" process typically represents an object-specifically identically performed measurement task under ideal, or reference, or normal, or norm conditions. In the second mode, the control module instructs the environment sensor arrangement to generate environmental information which characterizes the environment in which the six-DoF measurement aid is moving in such a way that this environmental information can be used to detect anomalies with respect to the environmental normal generated in the first mode. In the scope of the platform control assistance functionality, the control module is also configured to provide the environmental information generated in the first or second mode for control assistance of the platform control. The provision of the generated environmental information may in this case take place via a communicative connection to the platform control. In this case, a communicative connection to the platform control may, for example, be provided directly or else via further computer units. The communicative connection may in this case be carried out in a cable-based fashion or else wirelessly. In the scope of the platform control assistance functionality, the control module therefore instructs the environment sensor arrangement to generate environmental information mode-specifically and provides the environmental information thus generated so that this environmental information can be used for assistance by the platform control in order to control/adapt the automatic guiding of the platform.

Environmental information which is generated in the first mode is used to determine or to define a reference environment, i.e. an environmental normal. So that the environmental information thus generated can be used for this, it is typically generated under ideal, or reference, or normal, or norm conditions. Such ideal, or reference, or normal, or norm conditions are typically reproduced in a "teaching" process. Such a "teaching" process typically provides for an object/component to be measured under norm conditions. That is to say, the normed object/component is provided in a normed environment according to norm conditions. Measurement of the object/component is then carried out by the platform with coupled six-DoF measurement aid being automatically guided along the object/component so that the six-DoF measurement aid can measure the object points or regions of the object/component which are to be measured. In the course of this, environmental information relating to the environment in which the six-DoF measurement aid is moving, which can be used to determine the environmental normal, may then be generated by the environment sensor arrangement in the first mode. The environment sensor arrangement is instructed by the control module in the first mode to generate environmental information on the basis of predetermined criteria pertaining to the information content of the environmental normal, for example resolution or number of sensor values by means of which environmental information is generated by averaging. This may, for example, be carried out by means of a particular specification of a frequency with which environmental information is generated. This frequency specification may, for example, be ascertained automatically on the basis of the speed with which the six-DoF measurement aid is guided in the "teaching" process. The environmental normal which is determined on the basis of environmental information thus generated is used as a reference for environmental information which is generated in the second mode, i.e. when measuring the object/component under real conditions, which may deviate from the norm conditions.

Environmental information which is generated in the second mode is used to detect anomalies with respect to the environmental normal. In contrast to the environmental information which is generated in the first mode, environmental information is typically generated in the second mode in the course of a measurement of an object/component under real conditions. Typically, the nature, for example the dynamics, of the automatic guiding of the six-DoF measurement aid during the measurement of the object/component under real conditions differs from that under norm conditions. On the basis of further predetermined criteria pertaining to the information content of the environmental information generated in the second mode, the environment sensor arrangement is instructed by the control module to generate environmental information in the second mode. This may, for example, in turn be carried out by means of a further particular specification of a frequency with which environmental information is generated. This frequency specification may, for example, be ascertained automatically on the basis of the speed with which the six-DoF measurement aid is moved under real conditions. Environmental information generated in the second mode is used to detect anomalies in the environmental information with respect to the environmental normal.

The control module is configured in the scope of the platform control assistance functionality to provide environmental information generated in the first mode and in the second mode, so that
   this environmental information can be used
      i. to determine/define an environmental normal,
      ii. to detect an anomaly with respect to the environmental normal, and
   this environmental information can be used for control assistance by the platform control.

For example, the platform control may use the environmental information for control assistance such that the automatic guiding of the six-DoF measurement aid is adapted or interrupted on the basis of the detection of an anomaly. The control module with the platform control assistance functionality allows continuous control of the automatic guiding of the six-DoF measurement aid in the course of carrying out an object-/component-specific measurement task. The control of the automatic guiding is in this case based on the continuous detection of anomalies in the environment with respect to an environmental normal. An anomaly may, for example, be detected when an environmental information item which has been generated in the second mode does not match the corresponding environmental information of the environmental normal, i.e. the environmental information generated in the second mode does not coincide with the corresponding environmental information of the environmental normal except for particular deviations.

Such anomalies may for example be generated by an existing obstacle, a heat source/sink or else by an abnormal movement of the six-DoF measurement aid.

The continuous control, made possible in this way, of the automatic guiding of the six-DoF measurement aid makes object-/component-specific measurement tasks more efficient since, for example, abnormalities in the environment in which the six-DoF measurement aid is guided are detected and, for example, collisions may thereby be prevented. In this way, the automatically guided use of the six-DoF measurement aid may be carried out more freely from interruption and in a gentler fashion.

According to one embodiment of the six-DoF measurement aid, the environment sensor arrangement comprises a plurality of contactlessly measuring distance sensors, each distance sensor having a particular sensor field of view. The distance sensors are arranged on the six-DoF measurement aid in such a way that the sensor fields of view of the distance sensors supplement one another to form an environment sensor field of view surrounding the six-DoF measurement aid. The distance sensors are configured in the scope of the platform control assistance functionality to generate distance information relating to distances to surfaces within the environment sensor field of view as environmental information.

A contactlessly measuring distance sensor in this case typically has a funnel-shaped sensor field of view and generates distance information on the basis of which a distance from the six-DoF measurement aid to a surface in the sensor field of view can be ascertained. The contactlessly measuring distance sensors as part of the environment sensor arrangement allow characterization of the environment of the six-DoF measurement aid such that distances from the six-DoF measurement aid to surfaces within the environment sensor field of view can be ascertained continuously during the automatic guiding of the six-DoF measurement aid. Such distances may be used in the scope of the platform control assistance functionality to detect anomalies, for example by comparing the distances of the environmental normal with the distances respectively ascertained continuously during the automatic guiding of the six-DoF measurement aid under real conditions.

According to one embodiment of the six-DoF measurement aid, the control module is configured in the scope of the platform control assistance functionality, after generating distance information for a distance which falls below a first threshold value, to instruct the platform control to slow the guiding of the platform, and which falls below a second threshold value which is less than the first threshold value, to instruct the platform control to interrupt the guiding of the platform. For example, when falling below a first threshold value, the speed with which the platform is automatically guided can thus be reduced linearly until the guiding of the platform comes to a stop after falling below a second threshold value. In this case, the linear reduction of the speed may be carried out as a function of the distance information generated.

This makes it possible that the control module, independently of a detection of an anomaly, may also directly instruct the platform control to slow or to interrupt the automatic guiding of the six-DoF measurement aid in the event that a corresponding threshold value is fallen below. This represents an additional mechanism for preventing collisions with obstacles and may also be used as a redundant mechanism for the anomaly detection. Similarly, the control module may also be configured in the scope of the platform control assistance functionality, after generation of distance information for a distance which falls below a threshold value has previously taken place, to instruct the platform control to resume and/or to accelerate the guiding of the platform so long as such distance information is no longer generated.

According to a further embodiment of the six-DoF measurement aid, a flexible shape-adopting sensor skin as part of the environment sensor arrangement, comprising a multiplicity of contactlessly measuring sensor elements, lies on the six-DoF measurement aid, the sensor elements recognizing an approach of an obstacle to the sensor skin closer than a defined threshold value. In this case, in the scope of the platform control assistance functionality, the control module is configured, when recognizing an approach of an obstacle to the sensor skin closer than the defined threshold value, to instruct the platform control to interrupt the guiding of the platform.

In this case, contactlessly measuring sensor elements may be sensor elements from the group of sensor elements comprising: capacitive sensor elements, inductive sensor elements, time-of-flight-based sensor elements, ultrasound-based sensor elements, radar-based sensor elements, camera-based sensor elements, etc.

This makes it possible that the control module, independently of a detection of an anomaly, may also directly instruct the platform control to interrupt the automatic guiding of the six-DoF measurement aid in the event that an obstacle approaches the sensor skin closer than a predefined threshold value. This represents an alternative additional mechanism for preventing collisions with obstacles and may also be used as an alternative redundant mechanism for the anomaly detection. The sensor skin may also check the approach of an obstacle with a plurality of threshold values, the platform control correspondingly being instructed to adapt, for example to slow or to interrupt, the guiding of the six-DoF measurement aid as a function of the threshold value respectively fallen below. Similarly, the control module may also be configured in the scope of the platform control assistance functionality, after an approach of an obstacle to the sensor skin closer than a threshold value has previously taken place, to instruct the platform control to resume and/or to accelerate the guiding of the platform so long as such an approach of an obstacle is no longer recognized.

According to a further embodiment, the six-DoF measurement aid is at least partially framed by a rigid sensor housing as part of the environment sensor arrangement, the sensor housing recognizing mechanical contact of the sensor housing. In this case, the control module is configured in the scope of the platform control assistance functionality, when recognizing contact by means of the sensor housing, to instruct the platform control to interrupt the guiding of the platform.

This makes it possible that the control module, independently of a detection of an anomaly, may also directly instruct the platform control to interrupt the automatic guiding of the six-DoF measurement aid, for example by means of an emergency stop, in the event that mechanical contact of the sensor housing is recognized. This represents an alternative additional mechanism for preventing collisions with obstacles and may also be used as an alternative redundant mechanism for the anomaly detection.

According to one embodiment, the environment sensor arrangement comprises at least one camera sensor. The at least one camera sensor is configured in the scope of the platform control assistance functionality to generate image data relating to the environment of the six-DoF measurement aid as environmental information.

Typically, the camera sensor is part of a camera module having corresponding camera optics. The camera module has a particular camera field of view, the part of the environment of the six-DoF measurement aid which is acquired by the camera field of view being electronically acquirable by means of the camera module in the form of image data. Ideally, the environment sensor arrangement comprises a plurality of camera modules, which are arranged on the six-DoF measurement aid in such a way that the camera fields of view supplement one another to form an environment camera field of view surrounding the six-DoF measurement aid. In the scope of the platform control assistance functionality, the camera sensor is, or the camera modules are, configured to generate image data of the environment in which the six-DoF measurement aid is guided and which is acquired by the camera field of view, or environment camera field of view, as environmental information. The image data thus generated may be provided by the control module, for example for determining an electronic environmental image of the physical environment in which the six-DoF measurement aid is automatically guided. In this way, for example, on the basis of image data generated in the first mode, an electronic reference image of the environment may be generated as an environmental normal or part of the environmental normal. Image data which are generated in the second mode may then, for example, be compared with the reference image by means of image evaluation algorithms, on the basis of which anomalies may then be detected. The environmental information thus generated by means of a camera sensor, or camera module, is then provided by the control module in the scope of the platform control assistance functionality for control assistance of the platform control. For example, the platform control may adapt the automatic guiding of the six-DoF measurement aid on the basis thereof.

According to one embodiment, the environment sensor arrangement comprises at least one acceleration sensor. The at least one acceleration sensor is configured in the scope of the platform control assistance functionality to generate acceleration information relating to the movement of the six-DoF measurement aid in the environment as environmental information.

Typically, the acceleration sensor is part of an inertial measurement unit and one of a plurality of acceleration sensors. The acceleration information generated by the at least one acceleration sensor as environmental information may be provided by the control module, for example in order to determine movement trajectories of the six-DoF measurement aid during the automatic guiding, in which case the movement trajectories may comprise information relating to the position and/or orientation of the six-DoF measurement aid. In this way, for example, on the basis of acceleration information generated in the first mode, a reference movement trajectory may be determined/generated as environmental normal or part of the environmental normal. That is to say, the guided movement of the six-DoF measurement aid follows this reference movement trajectory under norm conditions. Acceleration information which is generated in the second mode may then be compared with the reference movement trajectory, on the basis of which anomalies may then be detected. The environmental information thus generated by means of an acceleration sensor is then provided by the control module in the scope of the platform control assistance functionality for control assistance of the platform control. For example, the platform control may adapt the automatic guiding of the six-DoF measurement aid on the basis thereof.

The acceleration information generated by the at least one acceleration sensor as environmental information may be provided by the control module in order, on the basis thereof, to ascertain the direction in which the six-DoF measurement aid is moved, for example by means of a Kalman filter. On the basis of the direction thus ascertained, the environment sensor arrangement may then be instructed to generate environmental information only of the environment which lies in the direction of the movement.

According to one embodiment, the environment sensor arrangement comprises at least one temperature sensor. In this case, the at least one temperature sensor is configured in the scope of the platform control assistance functionality to generate temperature information relating to the environmental temperature of the six-DoF measurement aid as environmental information.

The temperature information generated by the at least one temperature sensor as environmental information may be provided by the control module, for example in order to determine the environmental temperature of the environment in which the six-DoF measurement aid is automatically guided. For example, on the basis of temperature information generated in the first mode, a reference thermal image may thereby be determined/generated as environmental normal or part of the environmental normal. That is to say, the guided movement of the six-DoF measurement aid takes place under norm conditions in a temperature environment established in the reference thermal image. Temperature information which is generated in the second mode may then be compared with the reference thermal image, on the basis of which anomalies may then be detected. The environmental information thus generated by means of a temperature sensor is then provided by the control module in the scope of the platform control assistance functionality for control assistance of the platform control. For example, the platform control may adapt the automatic guiding of the six-DoF measurement aid on the basis thereof.

The environment sensor arrangement may also comprise further sensor elements, such as for example a barometric sensor for absolute height determination, GPS sensors for absolute position determination, etc.

According to one embodiment, the generation of the environmental information in the first mode differs at least in the rate of the environmental information generation from that in the second mode.

The generation of environmental information in the first mode typically takes place in the scope of a "teaching" process under norm conditions. In this case, environmental information generated in the first mode is provided by the control module in order to determine an environmental normal. Typically, the environmental normal to be determined has to fulfill particular criteria. These criteria may for example pertain to a local resolution of the environmental information, a significance of the environmental information generated, etc. On the basis of these particular criteria, the control module may then instruct the environment sensor arrangement to generate environmental information criterion-specifically. For example, on the basis of a required local resolution of the environmental information of the environmental normal, a frequency/rate with which the environmental information should be generated may be ascertained as a function of the speed with which the scanner is guided. The control module then instructs the environment sensor arrangement in the first mode to generate environmental information with the frequency thus determined. In analogy with the criteria pertaining to the environmental normal, criteria may be placed on the detection of anomalies. These criteria in turn determine the instruction of the control module to the environment sensor arrangement to generate environmental information in the second mode. For example, other criteria in relation to the local resolution, or significance of the environmental information to be generated therefor, may be determined for the anomaly detection. This may then, for example, lead to other frequencies/rates with which the environmental information is generated in the second mode.

According to one embodiment, the six-DoF measurement aid comprises visual markings which are arranged in a defined spatial relation forming a pattern on the six-DoF measurement aid in a marking region and make the orientation of the six-DoF measurement aid determinable for a laser tracker, and a reflector which is assigned to the visual markings and makes the position of the six-DoF measurement aid determinable for a laser tracker.

The visual markings are arranged in a defined and fixed spatial relation to one another on the six-DoF measurement aid and thereby form a specific pattern, which is used to make the orientation of the six-DoF measurement aid determinable for a laser tracker. For example, such a laser tracker may comprise an image acquisition unit which is configured to project, or to image, patterns formed by visual markings onto a plane. By means of an image evaluation functionality, on the basis thereof an orientation-specific pattern may be identified or a change of the pattern may be assigned to an orientation change of the six-DoF measurement aid.

The reflector assigned to the visual markings is typically designed to reflect radiation impinging on it in the direction of a radiation source. Radiation reflected by the reflector makes the position of the six-DoF measurement aid determinable for a laser tracker. For example, the reflector may be irradiated with laser radiation of a laser tracker, which is then reflected by the reflector in the direction of the laser tracker. On the basis of the detection of the reflected laser radiation, the laser tracker may determine the precise angle at which the reflector is irradiated. On the basis of laser radiation reflected by the reflector, the distance to the reflector may likewise be determinable for a laser tracker. On the basis of the angle information pertaining to the direction of the emitted laser radiation and the distance determined to the reflector, the position of the reflector and therefore of the six-DoF measurement aid is determinable for the laser tracker.

According to one embodiment, the visual markings are light points and the reflector is a retroreflector.

According to one embodiment, the control module is configured to instruct the environment sensor arrangement, during the automatically guided movement along the predefined path, in a third mode to generate environmental information for maintaining of a defined distance to an object having object points to be measured.

This makes it possible that the path only needs to be approximately predefined and the automatic guided movement can be adapted during the automatically guided movement along this approximately predefined path on the basis of the environmental information generated in such a way that the six-DoF measurement aid continuously has a defined distance to the object to be measured, or to the surface to be measured, during the automatic guiding. This defined distance may—in the event that the six-DoF measurement aid is for example an optical scanner moved in a mobile fashion—correspond to an optimal distance, predetermined by the type of scanner, for measuring surfaces.

According to one embodiment, the six-DoF measurement aid is an optical scanner moved in a mobile fashion in order to determine 3D coordinates of a multiplicity of object points to be measured in the form of 3D points of a point cloud in cooperation with a laser tracker, having an optical sampling module for the optical radiation-based sampling of object points, on the basis of which the determination of 3D points is carried out.

According to one embodiment, the environment sensor arrangement comprises a reading sensor arrangement which, in the scope of the platform control assistance functionality, is configured to recognize an identification mark and/or an identification pattern in the environment of the six-DoF measurement aid and to generate identification information, assigned to the identification mark and/or the identification pattern, as environmental information.

The reading sensor arrangement may, for example, provide the functionality of an NFC reader based on "near-field communication" (NFC) technology. In this way, an NFC-based identification mark, which is for example applied on an object to be measured or is assigned thereto, may be recognized and the identification information associated therewith may be generated as environmental information. In a similar way, the reading sensor arrangement may also be based on Bluetooth technology or other wireless data transmission technologies. The reading sensor arrangement may also provide the functionality of a reader for scanning identification patterns, such as for example barcodes, QR codes, etc., and generate the identification information associated therewith as environmental information.

The invention also relates to a system comprising a six-DoF measurement aid according to the invention, which can be coupled to a platform automatically guided by means of a platform control, the platform being automatically guided along an at least approximately predefined path in an environment in order to carry out repeated measuring tasks, and an anomaly detection unit, which can be communicatively connected to the control module of the six-DoF measurement aid, wherein environmental information generated in the scope of the platform control assistance functionality by the environment sensor arrangement is provided by the control module of the anomaly detection unit, and the anomaly detection unit is configured, in a first mode, on the basis of environmental information, to generate a reference environment in which the six-DoF measurement aid is automatically guided as an environmental normal, in a second mode to detect anomalies with respect to the environmental normal on the basis of environmental information, and to instruct the platform control to adapt the guiding of the platform on the basis of detected anomalies.

The anomaly detection unit in this case typically comprises a processor, a memory and a communication interface. This makes it possible to receive, store and process generated environmental information, in order to detect anomalies for example by means of comparing environmental information generated in the second mode with the environmental normal, and on the basis thereof to instruct the platform control to adapt the guiding of the platform with control assistance.

The environmental information provided by the control module for determining an environmental normal may also be stored by the anomaly detection unit, or the environmental normal determined may be stored, so that environmental information generated by the environment sensor arrangement may be compared with stored environmental normals and an environmental normal is recognized on the basis of the comparison, and on the basis thereof the platform control is instructed to adapt the guiding of the platform. The number of "teaching" processes may therefore be reduced.

The recognition or identification of an environmental normal and its use to instruct the platform control to adapt the automatic guiding of the platform may be carried out by means of identification marks/patterns applied on the object to be measured and the environment sensor arrangement, for example on the basis of the use of NFC technology and/or of Bluetooth technology or of optical barcode and/or QR code scanner technology. In this case, on the basis of the recognition by means of an environment sensor arrangement, for example, of an NFC tag or radiofrequency identification RFID tag on the object to be measured, the correspondingly stored environmental normal would be used to instruct the platform control to adapt the guiding of the platform.

According to one embodiment, the environmental information comprises at least one information item from the group of information items comprising distance information, image data, acceleration information, and temperature information. In this case, the anomaly detection unit is configured to assign environmental information to a point of the path at which the six-DoF measurement aid is located at the instant of the generation of the environmental information, and to detect anomalies on the basis of a comparison of environmental information of a point of the path with the environmental normal of the point.

The group of information items may also comprise absolute position information, for example of GPS sensors and/or barometric sensors, etc.

This for example makes it possible that, in the case of an object-/component-specific measurement task, in the scope of the "teaching" process the six-DoF measurement aid is guided along an at least approximately predefined path to the object points or regions to be measured and, for example, distance information, image data, acceleration information and temperature information are generated during this and the environmental information thus generated is then assigned by the anomaly detection unit to points of the path at which the environmental information was generated, and an environmental normal is determined on the basis thereof in the first mode. The guiding along the path may also be repeated, in order for example to determine the environmental normal on the basis of averaged environmental information. Environmental information which has been generated in the scope of carrying out the same measurement task under real conditions is then likewise assigned by the anomaly detection unit in the second mode to points of the path at which the environmental information was generated, the detection of anomalies then being carried out on a comparison of environmental information generated in the second mode with environmental information of the environmental normal, the environmental information items having been generated at mutually corresponding points. In this case, the mutually corresponding points need not necessarily be the same points, but may correspond to one another on the basis of a particular criterion.

According to one embodiment, the anomaly detection unit is configured, in a third mode, on the basis of environmental information, to determine a distance to an object having object points to be measured, and on the basis thereof to instruct the platform control to adapt the guiding of the platform in such a way that a defined distance to the object is maintained.

According to one embodiment, the system comprises a laser tracker having a position and orientation determination functionality for determining a position and orientation of the six-DoF measurement aid.

According to one embodiment, the laser tracker is configured, on the basis of the pattern formed by the visual markings, and by means of the reflector, to determine 3D coordinates of object points in the form of 3D points of a point cloud.

According to one embodiment, the system comprises an optical scanner moved in a mobile fashion as six-DoF measurement aid, the laser tracker being configured, on the basis of the optical radiation-based sampling of object points, to determine 3D coordinates of the object points in the form of 3D points of a point cloud.

The invention also relates to a system for retrofitting six-DoF measurement modules so that a six-DoF measurement aid according to the invention is provided. The system comprises an environment sensor arrangement for generating environmental information, and a control module which can be communicatively connected to the environment sensor arrangement and to a platform control, the platform control being configured to automatically guide a platform along an at least approximately predefined path in an environment in order to carry out repeated measuring tasks, wherein the environment sensor arrangement is configured to be fitted removably on the six-DoF measurement aid, and the control module comprises a platform control assistance functionality, in the scope of which the control module is configured to instruct the environment sensor arrangement, during the automatically guided movement along the predefined path, in a first mode to generate environmental information for determining an environmental normal, and in a second mode to generate environmental information for detecting anomalies with respect to the environmental normal, and to provide the environmental information generated by the environment sensor arrangement for control assistance of the platform control.

In this case, for example, individual sensor elements of the environment sensor arrangement may be fitted on the six-DoF measurement aid in a particular position relation relative to one another. The application may, for example, be carried out by means of an adhesive layer which a respective sensor element comprises, the adhesive layer allowing a releasable connection between sensor element and six-DoF measurement aid. As an alternative, the sensor elements of the environment sensor arrangement may for example also be fitted on a flexible carrier unit, the carrier unit being configured to be carried by the six-DoF measurement aid, i.e. to be placed on the six-DoF measurement aid, so that the sensor elements have a fixed and defined relative position relation with respect to one another on the six-DoF measurement aid.

According to one embodiment, the control module is configured, in a third mode, to generate environmental information for maintaining a defined distance to an object having object points to be measured.

BRIEF DESCRIPTION OF THE FIGURES

The six-DoF measurement aid according to the invention will be described in more detail below purely by way of example with the aid of specific exemplary embodiments represented schematically in the figures, further advantages of the invention also being discussed. In detail.

DETAILED DESCRIPTION OF THE INVENTION

Figure 1:
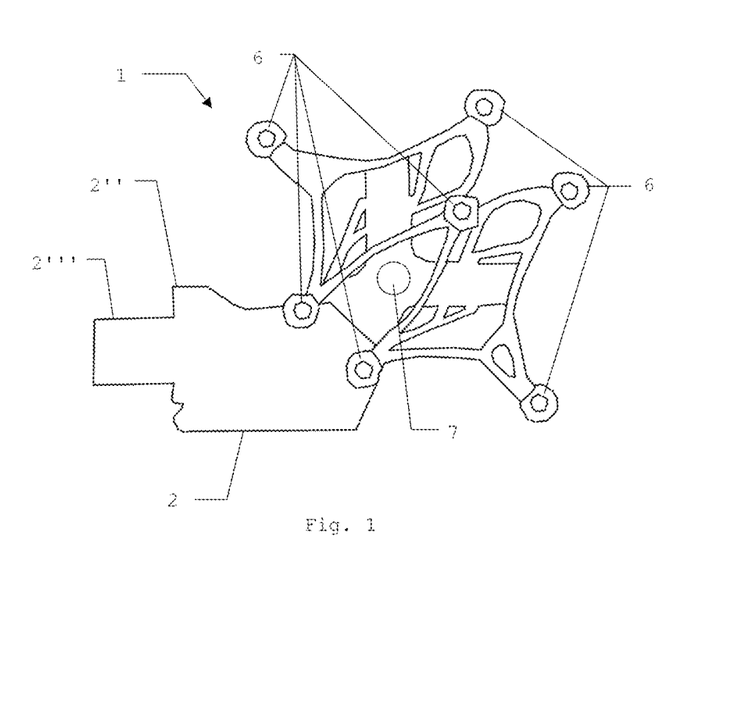
FIG. 1 shows an embodiment of the six-DoF measurement aid with a coupling device, visual markings and a reflector.

FIG. 1 shows a possible embodiment of the six-DoF measurement aid 1. It comprises a coupling device 2 which makes it possible alternatively to couple either a handle 9 to the six-DoF measurement aid 1 or the six-DoF measurement aid 1 to an automatically guided platform. The six-DoF measurement aid 1 furthermore comprises further coupling devices 2", 2''', by means of which contactlessly measuring measurement sensor constructions such as optical scanners/sensors 10, such as for example laser scanners, white-light scanners, and/or haptically measuring sampling pins/sensors 10', can be coupled to the six-DoF measurement aid 1. The six-DoF measurement aid comprises visual markings 6, which are arranged in a marking region and have a defined spatial relation to one another. These visual markings are assigned a reflector 7, which is fitted on the six-DoF measurement aid 1.

Figure 2:
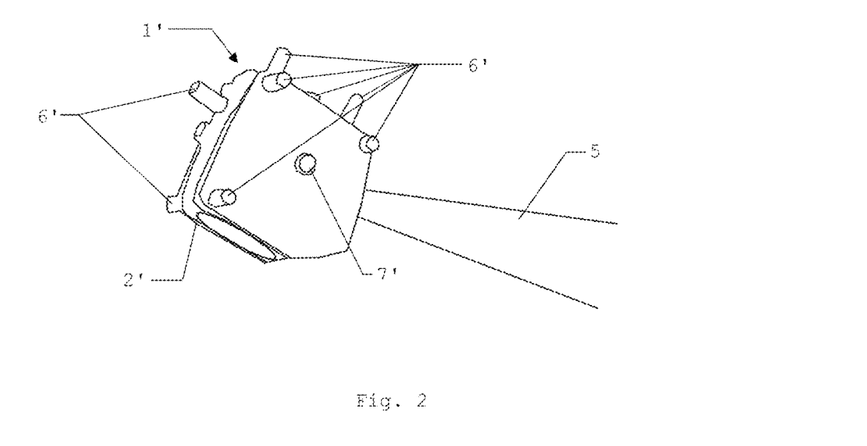
FIG. 2 shows an embodiment of the six-DoF measurement aid, configured as an optical scanner, which can be coupled to an automatically guided platform.

FIG. 2 shows a possible embodiment of the six-DoF measurement aid in which the latter is configured as an optical scanner 1'. The optical scanner is used to determine 3D coordinates of a multiplicity of object points to be measured in the form of 3D points of a point cloud in cooperation with a laser tracker. The optical scanner has an optical sampling module for the optical radiation 5-based sampling of object points, on the basis of which the determination of 3D points is carried out. The optical scanner also comprises a plurality of marking regions, in which visual markings 6' are respectively arranged in a particular spatial relation to one another. The marking regions likewise respectively comprise a reflector 7', which is assigned to the visual markings in the respective marking region. The optical scanner has a coupling device 2' for coupling the optical scanner to a platform 4, 4' automatically guided by means of a platform control, and/or to a handle 9.

Figure 3:
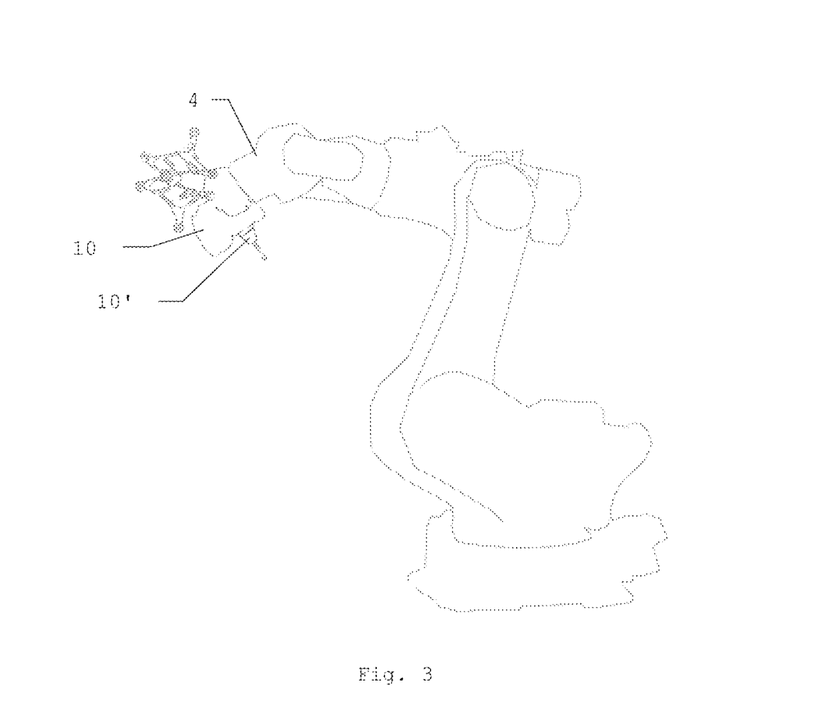
FIG. 3 shows an embodiment of the six-DoF measurement aid, coupled to an automatically guided platform, coupled with an optical scanner and a sampler for measuring points of an object surface.

FIG. 3 shows a possible embodiment of the six-DoF measurement aid coupled to a platform 4 automatically guided by means of a platform control. Coupled to the six-DoF measurement aid are a contactlessly measuring optical scanner 10 and a haptically measuring sampler 10' for measuring points of an object surface.

Figure 4:
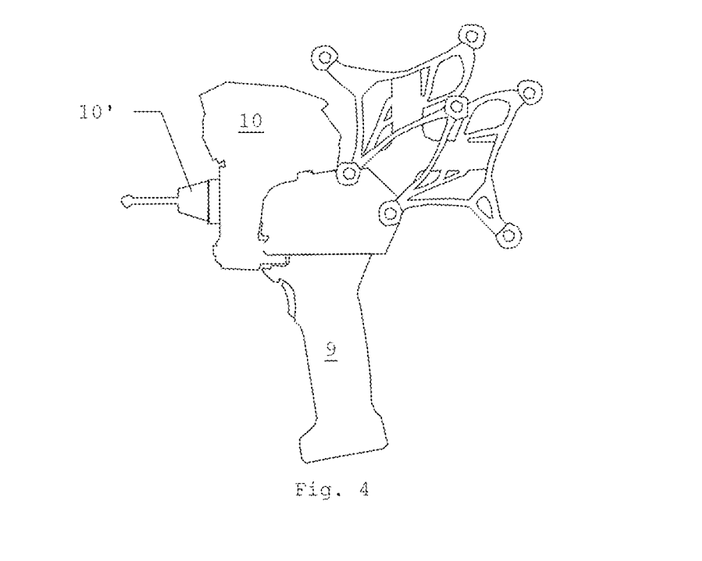
FIG. 4 shows an embodiment of the six-DoF measurement aid coupled to an optical scanner, a sampler and a handle.

FIG. 4 shows a possible embodiment of the six-DoF measurement aid with a coupled handle 9.

Figure 5:
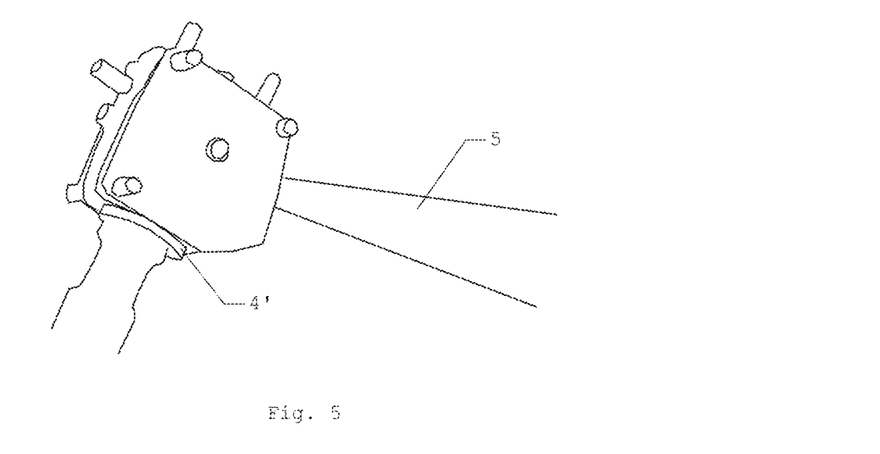
FIG. 5 shows an embodiment of the six-DoF measurement aid configured as an optical scanner coupled to an automatically guided platform.

FIG. 5 shows a possible embodiment of the six-DoF measurement aid coupled to a platform 4'.

Figure 6:
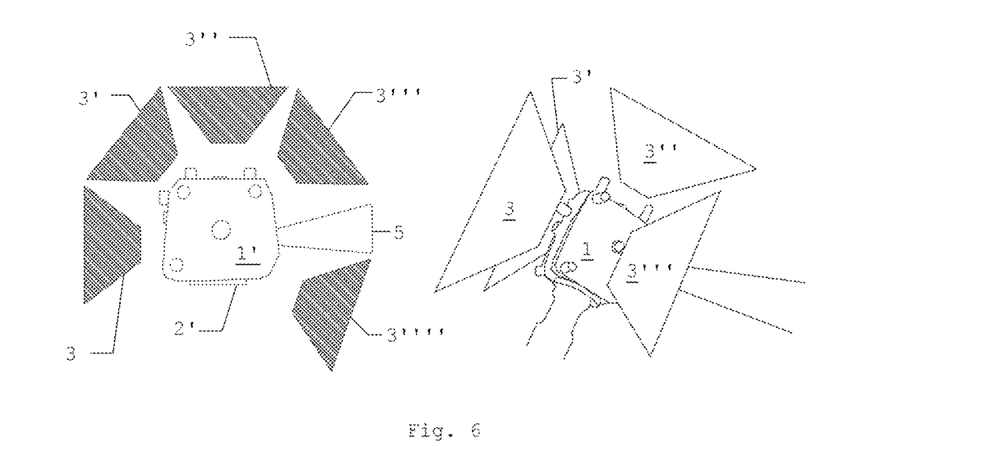
FIG. 6 shows an embodiment of the six-DoF measurement aid configured as an optical scanner with sensor fields of view.

FIG. 6 shows a possible embodiment of the six-DoF measurement aid comprising an environment sensor arrangement having a multiplicity of distance sensors, which respectively have a sensor field of view 3, 3', 3", 3"". The distance sensors are in this case arranged on the six-DoF measurement aid in such a way that the sensor fields of view supplement one another to form an environment sensor field of view surrounding the six-DoF measurement aid.

Figure 7:
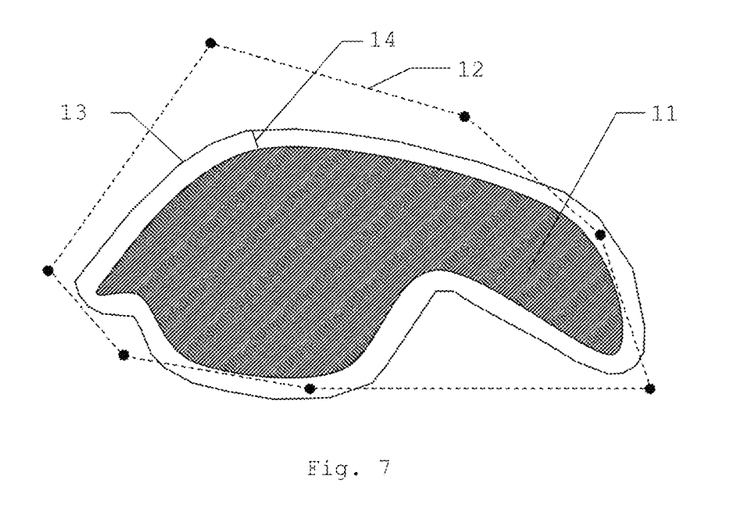
FIG. 7 shows an object to be measured, with an approximately predefined path assigned to the object.

FIG. 7 schematically shows an object 11 to be measured, with a surface having points to be measured. An approximately predefined path 12 is also shown around the object to be measured. The six-DoF measurement aid coupled to an automatically guided platform is in this case automatically guided along the approximately predefined path in order to measure the object or the surface, the control module being configured in the scope of the platform control assistance functionality to instruct the environment sensor arrangement, during the automatically guided movement along the predefined path 12, in a first mode to generate environmental information for determining an environmental normal, and in a second mode to generate environmental information for detecting anomalies with respect to the environmental normal, and to provide the environmental information generated by the environment sensor arrangement for control assistance of the platform control.

FIG. 7 also shows a path 13 which, according to one embodiment of the six-DoF measurement aid, can be generated automatically by means of the control module during the automatically guided movement along the approximately predefined path 12, so that a defined distance 14 to the object is maintained during the automatic guiding.

It is understood that these figures represented only schematically represent possible exemplary embodiments.

The invention claimed is:

1. A six-DoF measurement aid for use in a system comprising a laser tracker for position and orientation determination of the six-DoF measurement aid for determining 3D coordinates of a multiplicity of object points to be measured in the form of 3D points of a point cloud, having
a coupling device for coupling the six-DoF measurement aid to a platform which is automatically guided by means of a platform control, the platform being automatically guided along predefined path in an environment in order to carry out repeated measuring tasks,
an environment sensor arrangement for generating environmental information, and
a control module which is communicatively connected to the environment sensor arrangement and can be connected to the platform control, wherein
the control module comprises a platform control assistance functionality, in the scope of which the control module is configured, in a state coupled to an automatically guided platform,
to instruct the environment sensor arrangement, during the automatically guided movement along the predefined path,
i. in a first mode to generate environmental information for determining an environmental normal, and
ii. in a second mode to generate environmental information for detecting anomalies with respect to the environmental normal, and
to provide the environmental information generated by the environment sensor arrangement for control assistance of the platform control,
wherein the environment sensor arrangement comprises a plurality of contactlessly measuring distance sensors, each distance sensor has a particular sensor field of view, the distance sensors are arranged on the six-DoF measurement aid in such a way that the sensor fields of view of the distance sensors supplement one another to form an environment sensor field of view surrounding the six-DoF measurement aid, and
the distance sensors are configured in the scope of the platform control assistance functionality to generate distance information relating to distances to surfaces within the environment sensor field of view as environmental information,
wherein in the scope of the platform control assistance functionality, the control module is configured, after generating distance information for a distance:
which falls below a first threshold value, to instruct the platform control to slow the guiding of the platform, and
which falls below a second threshold value which is less than the first threshold value, to instruct the platform control to interrupt the guiding of the platform.

2. A six-DoF measurement aid for use in a system comprising a laser tracker for position and orientation determination of the six-DoF measurement aid for determining 3D coordinates of a multiplicity of object points to be measured in the form of 3D points of a point cloud, having
a coupling device for coupling the six-DoF measurement aid to a platform which is automatically guided by means of a platform control, the platform being automatically guided along a predefined path in an environment in order to carry out repeated measuring tasks,
an environment sensor arrangement for generating environmental information, and
a control module which is communicatively connected to the environment sensor arrangement and can be connected to the platform control, wherein
the control module comprises a platform control assistance functionality, in the scope of which the control module is configured, in a state coupled to an automatically guided platform,
to instruct the environment sensor arrangement, during the automatically guided movement along the predefined path,
i. in a first mode to generate environmental information for determining an environmental normal, and
ii. in a second mode to generate environmental information for detecting anomalies with respect to the environmental normal, and
to provide the environmental information generated by the environment sensor arrangement for control assistance of the platform control,
wherein:
a flexible shape-adopting sensor skin as part of the environment sensor arrangement, comprising a multiplicity of contactlessly measuring sensor elements, lies on the six-DoF measurement aid, the sensor elements recognizing an approach of an obstacle to the sensor skin closer than a defined threshold value, and in the scope of the platform control assistance functionality, the control module is configured, when recognizing an approach of an obstacle to the sensor skin closer than the defined threshold value, to instruct the platform control to slow and/or to interrupt the guiding of the platform.

3. The six-DoF measurement aid according to claim 1, wherein the six-DoF measurement aid is at least partially framed by a rigid sensor housing as part of the environment sensor arrangement, the sensor housing recognizing mechanical contact of the sensor housing, and in the scope of the platform control assistance functionality, the control module is configured, when recognizing contact by means of the sensor housing, to instruct the platform control to interrupt the guiding of the platform.

4. The six-DoF measurement aid according to claim 1, wherein the environment sensor arrangement comprises at least one camera sensor, and the at least one camera sensor is configured in the scope of the platform control assistance functionality to generate image data relating to the environment of the six-DoF measurement aid as environmental information.

5. The six-DoF measurement aid according to claim 1, wherein the environment sensor arrangement comprises at least one acceleration sensor, and the at least one acceleration sensor is configured in the scope of the platform control assistance functionality to generate acceleration information relating to the movement of the six-DoF measurement aid in the environment as environmental information.

6. A six-DoF measurement aid for use in a system comprising a laser tracker for position and orientation determination of the six-DoF measurement aid for determining 3D coordinates of a multiplicity of object points to be measured in the form of 3D points of a point cloud, having a coupling device for coupling the six-DoF measurement aid to a platform which is automatically guided by means of a platform control, the platform being automatically guided along a predefined path in an environment in order to carry out repeated measuring tasks, an environment sensor arrangement for generating environmental information, and a control module which is communicatively connected to the environment sensor arrangement and can be connected to the platform control, wherein the control module comprises a platform control assistance functionality, in the scope of which the control module is configured, in a state coupled to an automatically guided platform, to instruct the environment sensor arrangement, during the automatically guided movement along the predefined path, i. in a first mode to generate environmental information for determining an environmental normal, and ii. in a second mode to generate environmental information for detecting anomalies with respect to the environmental normal, and to provide the environmental information generated by the environment sensor arrangement for control assistance of the platform control, wherein:

the environment sensor arrangement comprises at least one temperature sensor, and the at least one temperature sensor is configured in the scope of the platform control assistance functionality to generate temperature information relating to the environmental temperature of the six-DoF measurement aid as environmental information.

7. The six-DoF measurement aid according to claim 1, wherein the generation of the environmental information in the first mode differs at least in the rate of the information generation from that in the second mode.

8. A six-DoF measurement aid for use in a system comprising a laser tracker for position and orientation determination of the six-DoF measurement aid for determining 3D coordinates of a multiplicity of object points to be measured in the form of 3D points of a point cloud, having a coupling device for coupling the six-DoF measurement aid to a platform which is automatically guided by means of a platform control, the platform being automatically guided along a predefined path in an environment in order to carry out repeated measuring tasks, an environment sensor arrangement for generating environmental information, and a control module which is communicatively connected to the environment sensor arrangement and can be connected to the platform control, wherein the control module comprises a platform control assistance functionality, in the scope of which the control module is configured, in a state coupled to an automatically guided platform, to instruct the environment sensor arrangement, during the automatically guided movement along the predefined path, i. in a first mode to generate environmental information for determining an environmental normal, and ii. in a second mode to generate environmental information for detecting anomalies with respect to the environmental normal, and to provide the environmental information generated by the environment sensor arrangement for control assistance of the platform control, wherein the six-DoF measurement aid comprises visual markings, which are arranged in a defined spatial relation forming a pattern on the six-DoF measurement aid in a marking region and make the orientation of the six-DoF measurement aid determinable for a laser tracker, and a reflector, which is assigned to the visual markings and makes the position of the six-DoF measurement aid determinable for the laser tracker.

9. The six-DoF measurement aid according to claim 8, wherein the visual markings are light points and the reflector is a retroreflector.

10. The six-DoF measurement aid according to claim 1, wherein the control module is configured to instruct the environment sensor arrangement, during the automatically guided movement along the predefined path, in a third mode to generate environmental information for maintaining of a defined distance to an object having object points to be measured.

11. The six-DoF measurement aid according to claim 1, wherein the six-DoF measurement aid is an optical scanner moved in a mobile fashion for determining 3D coordinates of a multiplicity of object points to be measured in the form of 3D points of a point cloud in cooperation with a laser tracker, having an optical sampling module for the optical radiation based sampling of object points, on the basis of which the determination of 3D points is carried out.

12. The six-DoF measurement aid according to claim 1, wherein
the environment sensor arrangement comprises a reading sensor arrangement which, in the scope of the platform control assistance functionality, is configured to recognize an identification mark and/or an identification pattern in the environment of the six-DoF measurement aid and to generate identification information, assigned to the identification mark and/or the identification pattern, as environmental information.

13. A system, comprising
a six-DoF oF measurement aid according to claim 1, which can be coupled to a platform automatically guided by means of a platform control, the platform being automatically guided along predefined path in an environment in order to carry out repeated measuring tasks, and
an anomaly detection unit, which can be communicatively connected to the control module of the six-DoF measurement aid, wherein
environmental information generated in the scope of the platform control assistance functionality by the environment sensor arrangement is provided by the control module of the anomaly detection unit, and
the anomaly detection unit is configured
i. in a first mode, on the basis of environmental information, to generate a reference environment in which the six-DoF measurement aid is automatically guided as an environmental normal,
ii. in a second mode to detect anomalies with respect to the environmental normal on the basis of environmental information, and
iii. to instruct the platform control to adapt the guiding of the platform on the basis of detected anomalies,
and/or
wherein
the environmental information comprises at least one information item from the group of information items comprising
distance information,
image data,
acceleration information, and
temperature information,
and
the anomaly detection unit is configured
i. to assign environmental information to a point of the path at which the six-DoF measurement aid is located at the instant of the generation of the environmental information, and
ii. to detect anomalies on the basis of a comparison of environmental information of a point of the path with the environmental normal of the point,
and/or
wherein the anomaly detection unit is configured, in a third mode, on the basis of environmental information, to determine a distance to an object having object points to be measured, and on the basis thereof to instruct the platform control to adapt the guiding of the platform in such a way that a defined distance to the object is maintained,
and/or
wherein the system comprises a laser tracker having a position and orientation determination functionality for determining a position and orientation of the six-DoF measurement aid,
and/or
wherein the laser tracker is configured,
on the basis of the pattern formed by the visual markings, and
by means of the reflector,
to determine 3D coordinates of the object points in the form of 3D points of a point cloud,
and/or
wherein the system comprises a six-DoF measurement aid and the laser tracker is configured, on the basis of the optical radiation-based sampling of object points, to determine 3D coordinates of the object points in the form of 3D points of a point cloud,
and/or
system for providing a six-DoF measurement aid, comprising
an environment sensor arrangement for generating environmental information, and
a control module which can be communicatively connected to the environment sensor arrangement and to a platform control, the platform control being configured to automatically guide a platform along an at least approximately predefined path in an environment in order to carry out repeated measuring tasks,
wherein
the environment sensor arrangement is designed to be fitted removably on the six-DoF measurement aid, and
the control module comprises a platform control assistance functionality, in the scope of which the control module is configured
i. to instruct the environment sensor arrangement, during the automatically guided movement along the predefined path,
1. In a first mode to generate environmental information for determining an environmental normal, and
2. in a second mode to generate environmental information for detecting anomalies with respect to the environmental normal,
and
ii. to provide the environmental information generated by the environment sensor arrangement for control assistance of the platform control,
and/or
wherein the control module is configured in a third mode to generate environmental information for maintaining a defined distance to an object having object points to be measured.

* * * * *